United States Patent [19]

Addiego et al.

[11] Patent Number: 5,260,241
[45] Date of Patent: Nov. 9, 1993

[54] CONTROLLED PORE SIZE PHOSPHATE-ALUMINA MATERIAL AND METHOD FOR PRODUCING SAME

[75] Inventors: William P. Addiego, Big Flats; Irwin M. Lachman; Mallanagouda D. Patil, both of Corning; Jimmie L. Williams, Painted Post, all of N.Y.

[73] Assignee: Corning Incorporated, Corning, N.Y.

[21] Appl. No.: 928,337

[22] Filed: Aug. 12, 1992

[51] Int. Cl.$^5$ .................. B01J 21/04; B01J 27/16; B01J 27/18; B01J 27/185

[52] U.S. Cl. .................... 502/60; 502/208; 502/209; 502/210; 502/211; 502/213; 502/439

[58] Field of Search ............... 502/208, 439, 60, 209, 502/210, 211, 213

[56] References Cited

U.S. PATENT DOCUMENTS

| | | | |
|---|---|---|---|
| 2,441,297 | 5/1948 | Stirton | 260/668 |
| 3,879,310 | 4/1975 | Rigge et al. | 252/435 |
| 3,885,977 | 5/1975 | Lachman et al. | 106/62 |
| 3,904,550 | 9/1975 | Pine | 252/437 |
| 3,969,273 | 7/1976 | Brown et al. | 252/435 |
| 4,127,691 | 11/1978 | Frost | 428/116 |
| 4,179,358 | 12/1979 | Swift et al. | 208/114 |
| 4,210,560 | 7/1980 | Kehl | 252/437 |
| 4,376,067 | 3/1983 | Vogel et al. | 252/437 |
| 4,382,877 | 5/1983 | Kehl | 252/437 |
| 4,382,878 | 5/1983 | Kehl | 252/437 |
| 4,743,572 | 5/1988 | Angevine et al. | 502/64 |
| 4,758,272 | 7/1988 | Pierotti et al. | 75/246 |
| 4,767,733 | 8/1988 | Chester et al. | 502/208 X |
| 4,977,129 | 12/1990 | Ernest | 502/213 X |
| 4,992,233 | 2/1991 | Swaroop et al. | 419/2 |
| 5,039,644 | 8/1991 | Lachman et al. | 502/208 |
| 5,139,989 | 8/1992 | Chao et al. | 502/214 |

FOREIGN PATENT DOCUMENTS

0292167B1 1/1992 European Pat. Off. .

*Primary Examiner*—W. J. Shine
*Attorney, Agent, or Firm*—L. Rita Quatrini

[57] ABSTRACT

A phosphate-$Al_2O_3$ material is disclosed wherein the phosphate is homogeneously dispersed throughout, the specific surface area as measured by $N_2$ BET method is at least about 50 m$^2$/g, and the average pore radius is no greater than about 200Å. A method is disclosed for producing the material which comprises forming a precursor material by wet-mixing a phosphate yielding species and an aluminum oxide yielding species which can be aluminum oxide, aluminum hydroxylated oxides, aluminum hydroxide, aluminum alkoxides, and combinations thereof, in amounts sufficient to result in an $AlPO_4$ content of about 3 to 12 percent by weight in the phosphate-$Al_2O_3$, drying and heat-treating the precursor material at a temperature and for a time sufficient to form the phosphate-$Al_2O_3$. The material is used as a support for catalyst metals.

34 Claims, 2 Drawing Sheets

CONTROLLED PORE SIZE PHOSPHATE-ALUMINA MATERIAL AND METHOD FOR PRODUCING SAME

This invention relates to a method for producing a high surface area phosphate-$Al_2O_3$ having a very small average pore size, and which is especially suited for use as support material for catalysts. The high surface area is maintained over long periods of time under conditions of high temperature which are encountered in the application. The high surface area afforded by the phosphate-$Al_2O_3$ preserves the active sites for the catalyst metals, thus prolonging the life of the catalyst.

BACKGROUND OF THE INVENTION

Catalysts for the oxidation of carbon monoxide and hydrocarbons, and for the reduction of nitrogen oxides of automobile exhaust emissions, are dispersed on washcoated metal or ceramic monoliths as automotive catalytic converters. Cerium oxide and/or cerium nitrate is usually mixed with gamma alumina to help improve catalytic performance, by providing oxygen under rich fuel conditions and is used also in a washcoat to increase dispersion of the metal catalysts, enhancing apparent catalytic activity. The surface area of gamma alumina decreases significantly during the aforementioned catalytic reactions at temperatures above about 600° C. as the system ages. The result of this "washcoat sintering" is the loss of alumina surface area (and therefore adsorption sites for the metal catalyst) This results in a decrease of metal dispersion with a resultant lowering of catalytic activity.

It would be advantageous, to have a high surface area washcoated substrate which can function as a catalyst support at high temperatures without any significant loss of surface area and activity.

European Patent publication No. 0,292,167 B1 relates to an amorphous, refractory composition, its synthesis and use as a catalyst support for organic compound conversion reactions, particularly hydrotreating of petroleum residue. The composition is a combination of a rare earth oxide, aluminum oxide, and aluminum phosphate having a specified surface area and pore volume.

SUMMARY OF THE INVENTION

In accordance with one aspect of the invention, there is provided a phosphate-$Al_2O_3$ material wherein the phosphate content is about 3 to 12 percent by weight, the specific surface area as measured by $N_2$ BET method is at least about 50 m$^2$/g, and the average pore radius is no greater than about 200Å.

In accordance with another aspect of the invention, there is provided a method for producing the phosphate-$Al_2O_3$, which comprises forming a precursor material by wet-mixing a phosphate yielding species and an aluminum oxide yielding species in amounts sufficient to result in an $AlPO_4$ content of about 3 to 12 percent by weight in the phosphate-$Al_2O_3$. The aluminum oxide yielding species can be hydrated aluminum oxide, aluminum hydroxylated oxides, aluminum hydroxide, aluminum alkoxides, and combinations thereof. The precursor material is dried and heat-treated at a temperature and for a time sufficient to form the phosphate-$Al_2O_3$, wherein the phosphate is homogeneously dispersed throughout.

The material is used as a support for catalyst metals.

DETAILED DESCRIPTION OF THE INVENTION

Figure 1:
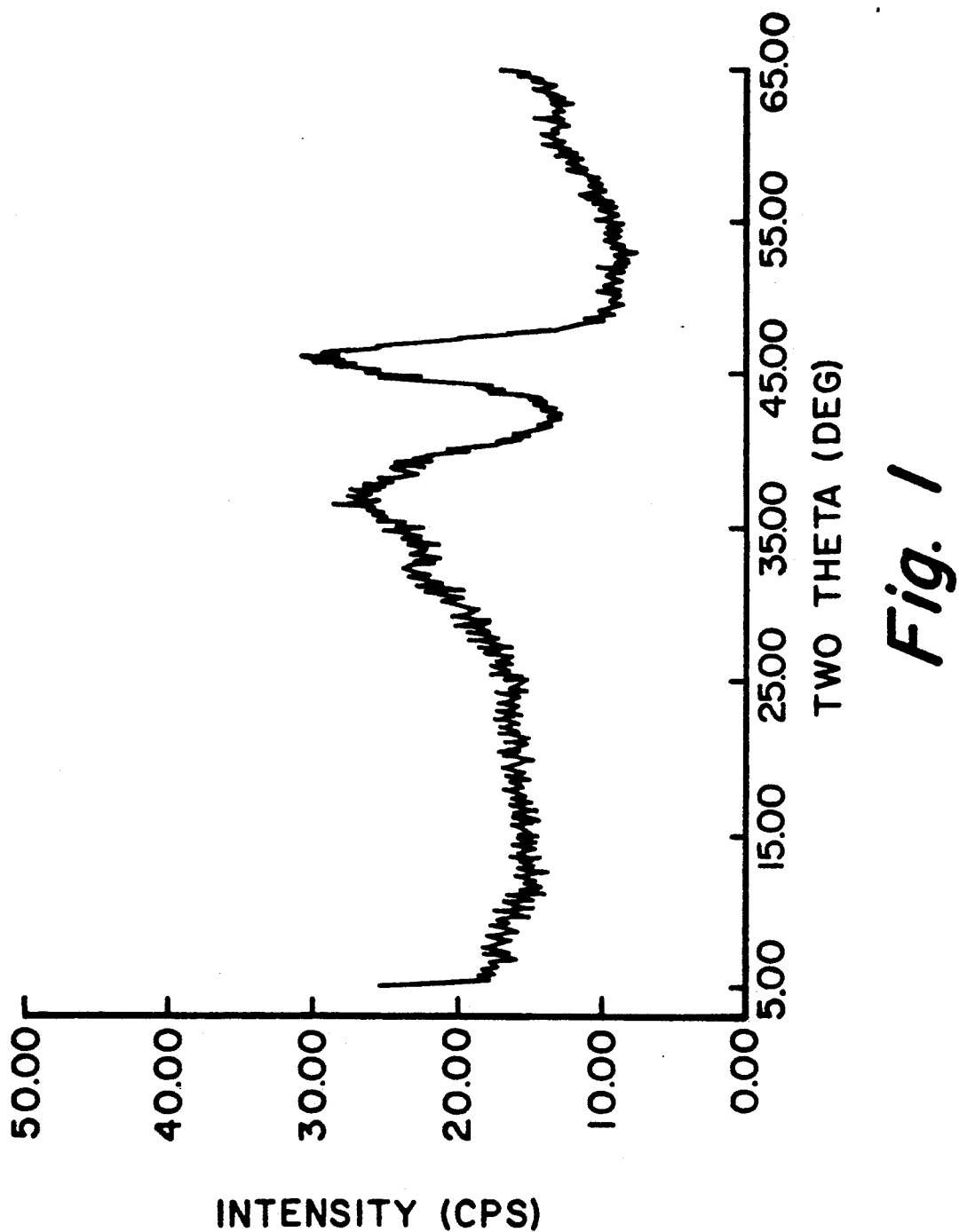
FIG. 1 is a typical x-ray diffraction pattern of the phosphate-$Al_2O_3$ material in which the $AlPO_4$ content is about 10% by weight.

The phosphate-$Al_2O_3$ material of the present invention is a material in which the phosphate is homogeneously dispersed on the $Al_2O_3$. The material is characterized by a specified surface area, pore size and pore size distribution. The material finds use in applications in which high temperature stable material of high surface area and controlled pore size is required, such as in catalysts. It is used typically in conjunction with other known catalyst system components such as, for example, metals, promoters, molecular sieves, binders, rheological modifiers, etc. In catalyst applications, the material is used as a support for the catalyst metal. In catalyst systems, catalytic activity is enhanced because the small pore size and high surface area allow the catalyst metal to be uniformly dispersed in the pores of the material; and the material can hold relatively large amounts of metal, if that is desired or required.

The material is produced by forming a precursor material by wet mixing a phosphate yielding species and an activated hydroxylated aluminum oxide, drying the precursor, and heat treating the precursor to form the product material.

The phosphate yielding species is one which decomposes to phosphate at the heat-treating temperature. It is preferred that the phosphate yielding species decompose cleanly and not leave contaminants behind. For this purpose then, the preferred phosphate yielding species are ammonium phosphate, (($NH_4)_3PO_4$), dibasic ammonium phosphate, monobasic ammonium phosphate, phosphoric acid, phosphorus acid and combinations of these. More preferred of these are the ammonium phosphates. The amounts of phosphate yielding species are sufficient to result in a phosphate content of about 3 to 12 percent by weight based on the $AlPO_4$ content in the product phosphate-$Al_2O_3$. (The $AlPO_4$ content refers to the nominal content and not necessarily to the crystalline form or compound $AlPO_4$.)

The aluminum oxide yielding species can be aluminum alkoxides such as aluminum isopropoxide, or an active hydroxylated aluminum oxide or combinations thereof. The activated hydroxylated aluminum oxide is typically hydrated aluminum oxide, aluminum hydroxylated oxides such as boehmite, aluminum hydroxides such as bayerite, and combinations thereof. More preferred are boehmite, gibbsite and combinations of these, with boehmite being especially preferred. Whether the species is in the form of hydroxide, oxides, hydrated, etc., it is the primary starting material for the phosphate-$Al_2O_3$ material. The alumina yielding species can be in the form of non-colloidal powder, colloidal powder such as boehmite, or a colloidal alumina sol commercially available, i.e., an alumina with particles in the colloidal size range suspended in some aqueous-compatible liquid medium e.g., Nyacol Al-20. The active surface hydroxyl groups are capable of reacting with the phosphate species to produce adsorbed phosphate on the alumina.

The materials are wet-mixed by for example, providing the aluminum oxide yielding species in the form of an alumina sol or colloidal solid. The pH can be stabilized on the acid side by addition of acids, eg., nitric acid if necessary to prevent premature flocculation of the alumina-yielding species. The phosphate yielding species is added to the alumina-yielding species preferably in solution form with adequate mixing to insure that the phosphate is intimately mixed with the alumina yielding species. The pH is then adjusted to the basic side if necessary to induce flocculation.

The resulting precursor material is then dried typically at temperatures of about 75° C. to about 150° C.

The dried precursor is then heat-treated at a temperature and for a time sufficient to form the product phosphate-$Al_2O_3$. Heat-treating temperatures are sufficient to remove intercalatial and structural water. Typical heat-treating temperatures are about 500° C. to about 700° C., and preferably about 500° C. to about 650° C. The preferred heat-treating times especially at the preferred temperatures are about 3 to 6 hours.

The product phosphate-$Al_2O_3$ material is characterized by having the phosphate adsorbed on the $Al_2O_3$. The phosphate is homogeneously dispersed throughout the phosphate-$Al_2O_3$ material. The phosphate content is typically about 3 to 12% and most advantageously about 7% to about 10% by weight of the material. A typical x-ray diffraction pattern of the phosphate-$Al_2O_3$ material in which the $AlPO_4$ content is about 10% by weight, is shown in FIG. 1.

Figure 2:
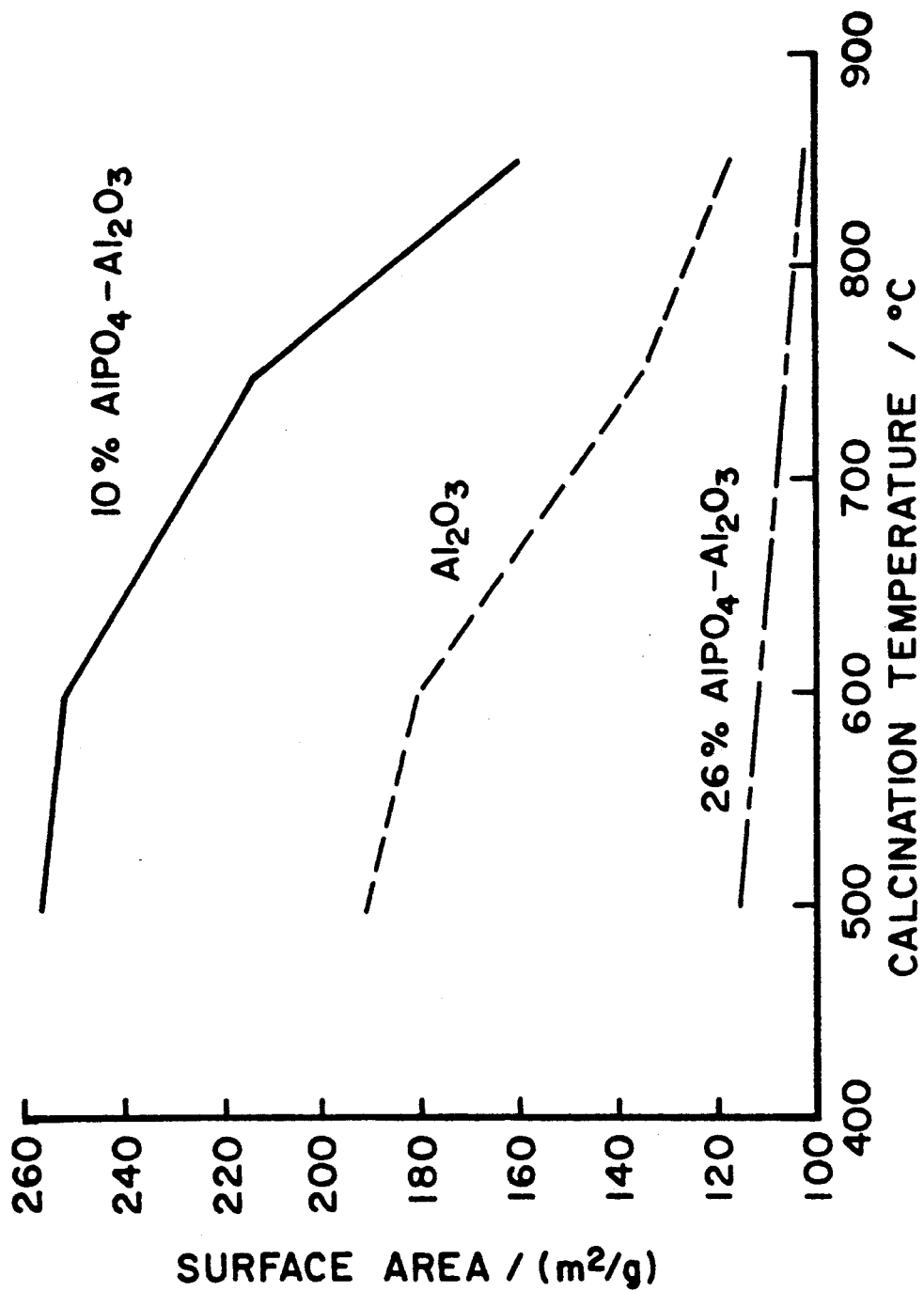
FIG. 2 shows the surface area of the phosphate-$Al_2O_3$ material of the present invention having about 10 wt.% $AlPO_4$ content, phosphate-$Al_2O_3$ having about 26 wt.% $AlPO_4$, and Catapal B Boehmite, versus calcination temperature.

The specific surface area of the material is greater than about 50 $m^2/g$, and more advantageously no less than about 150 $m^2/g$ and most advantageously about 180 to about 250 $m^2/g$. The surface area is measured by the $N_2$ BET method which is known in the art. The surface area is measured as specific surface area, that is, the surface area divided by the mass of a powder sample having essentially the same composition as the material. FIG. 2 shows the surface area of the phosphate-$Al_2O_3$ material of the present invention having about 10 wt.% $AlPO_4$ content, phosphate-$Al_2O_3$ having about 26 wt.% $AlPO_4$, and Catapal B Boehmite, versus calcination temperature. It can be seen that the surface area of the material of the present invention is higher over the higher temperature ranges than the other two materials.

Advantageously, the pore volume is about 0.3 to about 0.8 cc/g and most advantageously about 0.36 cc/g to about 0.43 cc/g.

The average pore radius is no greater than about 200Å, advantageously no greater than about 100Å, and most advantageously from about 20Å to about 40Å. Preferably in about 60% to about 85% and most preferably in about 80% of the pore volume, the pore radius is about 20–100Å. The average pore radius is measured by the five point BET method. Most advantageously, pore size distribution is as follows, based on cumulative pore volume: 5–10 vol% is within a pore size radius range of about 100–200Å, about 35–40 vol% is within a pore size radius range of about 50–100Å, about 30–50 vol% is within a pore size radius range of about 20–50Å.

The material can take any form convenient for the application. For example, in catalyst applications, it can be formed into self-supporting geometric shapes such as pellets, or it can be applied to a body or substrate, for example, as a coating on the body.

If the material is to be applied to a substrate in the form of a coating, a slurry is made up of the material. The slurry is then contacted with a substrate to form a green coating thereon which is the coating before heat-treating. This can be done by any convenient technique such as dipping, spraying, or washing, depending on size and geometry of the substrate, and the invention is not limited to any technique. However, most typically it is done by dipping the substrate in the slurry followed by drying to remove the slurry and other liquid phases that can be present. Excess slurry is removed from the substrate by being blown off. The dipping and drying is repeated if necessary until the desired amount of slurry components are applied.

The green coated substrate is then heat treated at sufficient temperature for a sufficient time to form the phosphate-$Al_2O_3$ as a washcoat on the substrate, and to bond the particulates of the washcoat to the substrate and to each other. The heat treating conditions vary with the specific slurry components, size and configuration of the substrate, and other processing conditions. However, in general the heat treating conditions are about 500° C. to about 700° C., and preferably about 500° C. to about 650° C. for about 3 to about 6 hours.

By virtue of the coating material, a high surface area and controlled pore size are imparted to the surfaces of the body for uses that require high surface area while the advantages afforded by the particular geometry, porosity, and strength of the body are retained.

The material serves as a support for a catalyst metal. By "catalyst metal" is meant one or more catalyst metals. A catalyst metal can be incorporated into the material in any of its forms, ie, whether the material is used by itself loosely, or formed into a body, or in contact with another body substrate. The catalyst metal can be incorporated onto or into the material by known techniques such as, for example, by predoping, ion exchange, precipitation, impregnation, etc. The catalyst metal is homogeneously distributed or dispersed on the material by virtue of its high surface area and pore size characteristics.

The catalyst metals are known in the art and the invention is not limited to the type of metals that can be used. However, the most suitable catalyst metals for the purposes of the present invention are transition metals, and Mg, Bi, and Sb. However, most typically the metals are at least one of the transition metal, e.g. of atomic numbers 21 thru 79, such as base metals and noble metals, eg. the Group 8 metals. Catalyst metal is meant to include any form in which the metal stays in contact with the material, such as for example metal or oxide forms.

One preferred way of incorporating the catalyst metal is to impregnate the washcoat after heat-treating followed by firing the resulting impregnated washcoat to form a highly dispersed metal catalyst thereon. This is done typically by dipping, spraying, or washing the washcoated substrate with a solution of the metal salt. This impregnation technique of applying metals to a substrate is known in the art. Impregnation of an already formed washcoat with the transition metal affords the advantage of more control over the amount of metal that is actually incorporated into the washcoat, and over the degree of dispersion in the washcoat. By incorporating the metal in this way, the Ph of the impregnating transition metal solution can be better controlled for the most effective impregnation. If the metal is in a slurry with other components, pH control cannot always be realized depending on what other components are present. Also, when the metal is applied in a separate step, the morphology of the metal does not change, thereby insuring uniformity of metal on the washcoat. If the metal is in a slurry with other components, it can possibly interact with them, with a resultant morphology change. This can inhibit effective incorporation into the washcoat, which can result in decreased catalytic activity. By impregnation of an already formed washcoat, the metal is more efficiently utilized and losses in incorporation of the metal are minimized. This is very important since these metals are very expensive.

The substrate can be in general, any type that can hold the catalyst It is to be understood that the invention is not limited to the nature of substrate materials. However, the substrate is most desirably made of any material that is suitable for high temperature applications. Some preferred materials are those that include as a predominant phase ceramic, glass-ceramic, glass, high surface area-high temperature stable oxides, metal, and combinations thereof. By combinations is meant physical or chemical combinations, eg., mixtures or composites. Some substrate materials that are especially suited to the practice of the present invention, although it is to be understood that the invention is not limited to these, are those made of cordierite, mullite, clay, talc, zircon, zirconia, spinel, alumina, silica, lithium aluminosilicates, alumina silica, feldspar, titania, fused silica, nitrides, carbides, borides, eg., silicon carbide, silicon nitride or mixtures of these. Some typical ceramic substrates are disclosed in U.S. Pat. Nos. 4,127,691 and 3,885,977. Those patents are herein incorporated by reference as filed. Some preferred metal substrates are stainless steels and iron group metal based bodies, (Fe, Co, Ni) such as, for example, Fe and Cr and/or Al bodies with optional additions of various metals and/or oxides for various properties and applications. Some typical metal or metal alloy bodies are disclosed in U.S. Pat. Nos. 4,758,272 and 4,992,233 and U.S. application Ser. No. 767,889, filed Sept. 30, 1991. Those patents and application are herein incorporated by reference as filed Electrically- heated porous or non-porous substrates are also suitable.

The substrates can be of any size and shape suitable to the application Preferred substrates are honeycomb structures.

Some examples of honeycombs produced by the process of the present invention, although it is to be understood that the invention is not limited to these, are those having about 94 cells/cm$^2$ (about 600 cells/in$^2$), about 62 cells/cm$^2$ (about 400 cells/in$^2$), or about 47 cells/cm$^2$ (about 300 cells/in$^2$), those having about 31 cells/cm$^2$ (about 200 cells/in$^2$), or those having about 15 cells/cm$^2$ (about 100 cells/in$^2$). These bodies are made preferably of, but not limited, to materials which when fired form cordierite. Typical wall thicknesses in catalytic converter applications, for example, are about 6 mils (about 0.15 mm) for 400 cells/in$^2$ (62 cells/cm$^2$) honeycombs. Wall thicknesses range typically from about 4 to about 25 mils (about 0 1 to about 0 6 mm). The external size and shape of the body is controlled by the application, e.g. engine size and space available for mounting, etc.

The substrate can have any degree of porosity from low to high. For example, typically the wall porosity ranges from about 0% by volume to higher values which are determined by practical limits depending on the composition of the substrate and the intended application. For example, in metal monoliths, the open porosity is typically about 1 to about 2% by volume, although it can be as high as about 40%. For ceramic monoliths, the open porosity is typically about 39% to about 50% by volume. The invention is especially suited for low-to-moderate porosity bodies, that is, those having total porosities of about 1% to about 35% by volume.

The invention is suited especially for use in catalysts for conversion of gaseous hydrocarbons, CO, and reduction of NO$_x$ as from automotive exhaust gas, to innocuous products. By innocuous products is meant those that are generally considered to be harmless to health and the environment, for example, $CO_2$, water, $N_2$, and $H_2$.

In auto exhaust conversion applications, the phosphate-$Al_2O_3$ can be used in any ways that are conventional or feasible for that application. For example, it is most typically used in three-way catalysts with other known components used in auto exhaust conversion such as various catalyst metals, various rheological modifiers, promoters, molecular sieves, rare earth oxides, other high surface area stable oxides, transition metal oxides, binders, etc.

The phosphate-$Al_2O_3$ of the present invention is most typically applied to a substrate, preferably a honeycomb, usually in the form of a coating thereon to form a washcoated substrate. This can be done in any way known in the art. The coating is applied usually by forming a slurry of the material and any other components to be used as part of the catalyst system.

The slurry medium in this invention can be any medium in which the components can be dispersed. Some suitable media can be aqueous, or non-aqueous media such as alcohol or ketone. The most preferred medium is water.

The catalyst metals are as previously described Some metals which are especially suited are the Group 8 metals such as for example, Rh and Pt and/or Pd.

A binder or binders can be present in the slurry to promote interparticle adhesion between the components as well as adhesion to the substrate. The binder or binders must be compatible with the other slurry components and the slurry medium. Some examples of binders are colloidal sols, eg., alumina sols, or colloidal alumina having an average particle size, for example, of about 2 to 50 nanometers in diameter. Preferred binders are colloidal alumina, boehmite, and combinations thereof. An especially suitable binder is boehmite.

The slurry can have components which render the slurry in a form suitable for application to the substrate, such as at least one rheological modifier. The rheological modifiers are agents which when present in the slurry modify the rheological properties of the slurry so that it can be applied uniformly to the substrate and for good structural integrity and to prevent unsatisfactory coating characteristics, e.g , cracking, chipping, and flaking. Rheological modifiers can be surfactants, dispersants, wetting agents, drying agents, which are soluble or insoluble in the slurry medium, and acids or bases. Some examples of rheological modifiers are rare earth oxides, commercial surfactants, etc. Some of the aluminum oxides such as boehmite, and aluminum hydroxylated oxides, for example, can function also as rheological modifiers. The preferred rare earth oxides are those of the "cerium subgroup", that is, elements of atomic number 57-62, particularly cerium and lanthanum. Cerium oxide is most preferred.

One example of an advantageous catalyst component which can be characterized as a catalyst or catalyst support is at least one molecular sieve, with the preferred types being zeolites. Some preferred zeolites are faujasite type, such as ultra stable Y, pentasil type, such as ZSM type as ZSM-5, mordenite, beta, and combinations of these. Zeolites can be with or without an exchanged metal such as, for example, rhodium. Zeolites with a high silica/alumina ratio, eg., of at least about 20/1 preferably about 50/1 and most preferably about 1200/1 are thermally stable.

The slurry components are added in amounts sufficient to result in the desired levels of the respective components in the washcoat. Those skilled in the art would know what amounts of slurry components to use.

The amount of slurry medium is sufficient to dissolve the soluble components and to evenly disperse the insoluble components.

Some typical slurry solid compositions, which will make up the washcoat (after drying and calcining), although it is to be understood that the invention is not limited to these, are as follows with water as the medium:

Typically any one rheological modifier or binder makes up no more than about 30% by weight of the washcoat.

The binder content is advantageously about 5% to about 10% by weight of the washcoat.

Some typical examples of compositions are in percent by weight:

1) about 20 to about 30 cerium oxide, <8 $ZrO_2$ (preferably no greater than about 5), and the balance being the phosphate-$Al_2O_3$ material;

2) about 18 to about 22 ceria, about 4 to about 6 zirconia, about 4 to about 6 alumina binder, and the balance being the phosphate-$Al_2O_3$ material;

3) about 13 to about 17 ceria, about 8 to about 12 zeolite, (which can be exchanged with a metal, such as preferably ZSM-5), about 4 to about 6 alumina binder, and the balance being the phosphate-$Al_2O_3$ material;

4) about 28 to about 32 ceria, about 4 to about 6 alumina binder, and the balance being the phosphate-$Al_2O_3$ material;

5) about 18 to about 22 ceria, about 8 to about 12 transition metal oxide, about 4 to about 6 alumina binder, and the balance being the phosphate $Al_2O_3$ material.

In any of the compositions of the present invention, impurities can be present up to a level of no greater than about 5% by weight.

The slurry is then contacted with a substrate to form a coating thereon as described previously.

One catalyst that is preferred for auto exhaust conversion is phosphate-$Al_2O_3$, cerium oxide, Rh and Pt and/or Pd wherein the weight ratio of Pt and/or Pd to Rh being about 5:1 to 30:1, the catalyst is in contact with a substrate, and the amount of Rh and Pt and/or Pd being about 1 to 2 g/l of substrate.

An especially preferred composition on a weight basis is about 20% to about 30% cerium oxide, <8% ZrO (preferably no greater than about 5%), weight ratio of Pt and/or Pd to Rh being about 10:1, and the amount of Rh and Pt and/or Pd being about 1 to 2 g/l of substrate, and the balance being the phosphate-$Al_2O_3$ material.

To more fully illustrate the invention, the following non-limiting examples are presented. All parts, portions, and percentages are on a weight basis unless otherwise stated.

Preparation of phosphate-$Al_2O_3$ material

An aqueous $(NH_4)_2PO_4$ solution is prepared by dissolving about 17 g in about 100 g of deionized water. This solution is slowly added to about 200 g of boehmite alumina, (Catapal B boehmite), while mull mixing. The resulting material is wet, where the boehmite clings to itself. Mixing is continued to homogeneously distribute the phosphate. The wet mixture is dried at about 50°-100° C. The mixture can be re-wetted with deionized water, remixed and dried as above, and this procedure can be repeated several times to insure proper distribution of the phosphate. After drying, the mixture is calcined at about 600° C. for about 6 hours in air. The resulting phosphate-$Al_2O_3$ material contains about 10% by weight $AlPO_4$ (calculated as aluminum phosphate although crystalline phase of aluminum phosphate need not be present in the material). The balance of the material is amorphous or g-alumina, and/or higher transitional phases of alumina.

Formation of a washcoat using the phosphate-$Al_2O_3$ material

A slurry of the above phosphate-$Al_2O_3$ material is prepared by combining about 120 g of the material, about 42.8 g of bulk cerium oxide, and 43 g (about 8.6 g solid alumina) of a suspended colloidal alumina binder. To the solids, about 140 g of deionized water is added. Thus, the solid content of the slurry is approximately 50% by weight. To the slurry, nitric acid is added to adjust the pH to about 3.7 to about 4.2. The slurry is then ball-milled to reduce the mean particle size the solids to about 3 to 6 microns.

The slurry is recovered after ball-milling, and the pH is adjusted to about 3 8 to 4.1, if necessary using nitric acid. Optionally, a non-ionic surfactant can be added to the slurry as about 0.3 wt% of the slurry solids.

Ceramic or metal honeycomb bodies are immersed in the slurry, removed and air-jetted to remove excess slurry medium, and dried at about 100°-150° C. The immersion and air jetting steps are repeated to obtain the desired loading of washcoat on the body to form washcoated substrates. The washcoated substrates are calcined, typically at about 600° C. for about 6 hours. The washcoat composition is as follows:
about 70% phosphate-$Al_2O_3$ material
about 25% bulk cerium oxide
about 5% colloidal alumina binder (solid content).

The calcined washcoated substrates are impregnated with catalytically active metals as described below.

Catalyzing the washcoated honeycomb bodies

Solutions of Pt and Rh salts are prepared so that immersing the washcoated bodies into these solutions impregnates the washcoats to the desired catalyst metal loading. Ordinarily, the pH of the impregnating solutions is kept at about 2, by adding mineral acid if necessary.

Test Procedure

The samples prepared above are tested as follows:
All washcoated/catalyzed honeycombs are about 25 mm diameter × 25 mm in length, about 62 cells/$cm^2$. All samples have about 0.2 g/cc of washcoat material. The samples are loaded into a quartz tube, which is contained in a tube furnace.

A synthetic auto exhaust gas mixture is made having the following composition by vol:
$O_2$-0.77%, $H_2$-0.33%, propane-167 ppm, NO-1000 ppm, $CO_2$-14%,
propylene-333 ppm, CO-1%, $SO_2$-23 ppm, water-10%, balance $N_2$.
Space velocity of about 50,000 volume changes/hr.

Samples are temperature ramped to about 600° C. at a rate of about 10° C./min. They are then cooled to about 25° C., followed by a second temperature increase to about 600° C., whereupon the temperature is held constant and the redox ratio is varied by changing the oxygen content in the gas stream and compensating with nitrogen. At each redox ratio, conversions of exhaust are allowed to come to steady-state before proceeding to the next ratio.

EXAMPLE 1

A sample as prepared above and a sample of a commercial fresh catalyst, each having a total Pt and Rh content of about 1.2 g/l, and a Pt:Rh weight ratio of about 10:1 were tested according to the above described procedure. These samples were then steam aged at about 970° C. for about 4 hours in 10% water balanced nitrogen The above test was repeated on these steam aged samples. The ammonia formation from each test was measured and is given in Table 1 below.

TABLE 1

| Ammonia Formation at Redox Ratio of 1.25 | | |
|---|---|---|
| CATALYST | | $NH_3$ Vol. ppm |
| This Invention | Fresh | <15 |
|  | Aged | <15 |
| Commercial | Fresh | >200 |
|  | Aged | >200 |

The results in Table 1 show that the ammonia formation is significantly less than in a commercial fresh and aged catalyst. The light-off temperatures, that is, the temperatures at which there has been about 50% conversion, are shown in Table 2. It can be seen that the light off temperatures are comparable for samples both of the present invention and the commercial catalyst. The light-off temperatures are lower for the steam aged sample of the present invention than for the commercial steam-aged catalyst sample. This indicates that the catalyst of the present invention has better thermal stability than the commercial catalyst.

TABLE 2

| SAMPLE | | EXHAUST GAS LIGHT-OFF TEMP. - °C. | | |
|---|---|---|---|---|
|  |  | CO | $NO_x$ | Hydrocarbons |
| This invention | Fresh | 271 | 271 | 290 |
|  | Steam Aged | 309 | 291 | 335 |
| Commercial Std. | Fresh | 270 | 270 | 290 |
|  | Steam Aged | 335 | 310 | 358 |

EXAMPLE 2

The above washcoat composition was modified to include about 5% by weight zirconia:
about 70% phosphate-$Al_2O_3$ material
about 20% bulk cerium oxide
about 5% zirconia
about 5% colloidal alumina binder (solid content).

This sample and the previously described 70% phosphate-$Al_2O_3$ material-25% bulk cerium oxide-5% colloidal alumina binder sample were tested. The weight ratio of Pt:Rh is about 5:1 and the total noble metal loading is about 1.4 g/l of substrate. The results, given in Table 3 show good light-off.

TABLE 3

| CATALYST-WASHCOAT | EXHAUST GAS LIGHT-OFF·TEMP. - °C. | | |
|---|---|---|---|
| (Phosphate-$Al_2O_3$ Material +) | CO | $NO_x$ | Hydrocarbons |
| $Al_2O_3$—$CeO_2$ | 214 | 211 | 232 |
| $Al_2O_3$—$CeO_2$—$ZrO_2$ | 213 | 207 | 217 |

EXAMPLE 3

Two commercial catalysts and a catalyst prepared according to the present invention having 70% phosphate-$Al_2O_3$ material-25% bulk cerium oxide-5% colloidal alumina binder were pre-aged in an engine dynamometer at about 750° C. for about 100 hours and subjected to the test procedure. The light-off temperatures are given in Table 4. It can be seen that after extensive operation, the light-off temperatures are lower with the catalyst of the present invention than for both commercial catalysts even when the noble metal loading is lower.

TABLE 4

| CATALYST | LIGHT-OFF TEMP. - °C. | | | Pt:Rh | Noble Metal Loading g/l |
|---|---|---|---|---|---|
|  | CO | $NO_x$ | Hydrocarbons |  |  |
| Commercial 1 | 364 | 364 | 375 | 10:1 | 1.2 |
| Commercial 2 | 299 | 283 | 329 | 5:1 | 1.6 |
| This Invention | 276 | 250 | 297 | 5:1 | 1.4 |

EXAMPLE 5

A solution of phosphoric acid containing about 12.6 g of $H_3PO_4$ is added to deionized water such that the pH is about 4 and the volume of the solution is about 100 ml. The pH of the water is adjusted if necessary to prevent premature flocculation of the alumina sol. The solution is slowly added to about 700 g of colloidal alumina sol, such as Nyacol Al-20, with constant mixing. The pH of the mixture is raised to about 8-14 with ammonium hydroxide, causing flocculation. The solids are centrifuged, washed several times in deionized water, dried at about 100°-150° C., and calcined at about 600° C. for about 6 hours. The resulting composition contains about 10% $AlPO_4$. This phosphate-$Al_2O_3$ material is then used as described above to form a washcoat slurry which is applied to a honeycomb substrate. The washcoated honeycomb is then catalyzed as described above.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method for producing phosphate-$Al_2O_3$, the method comprising:
   a) forming a precursor material by wet-mixing a phosphate yielding species and an aluminum oxide yielding species selected from the group consisting of hydrated aluminum oxide, aluminum hydroxylated oxides, aluminum hydroxide, aluminum alkoxides, and combinations thereof, in amounts sufficient to result in an $AlPO_4$ content of about 3 to 12 percent by weight in the phosphate-$Al_2O_3$;

b) drying the precursor material; and c) heat-treating the precursor material at a temperature and for a time sufficient to form the phosphate-$Al_2O_3$, wherein the phosphate is homogeneously dispersed throughout, the specific surface area as measured by $N_2$ BET method is at least about 50 $m^2/g$, and the average pore radius is no greater than about 200Å.

2. A method of claim 1 wherein the phosphate yielding species is selected from the group consisting of ammonium phosphate, dibasic ammonium phosphate, monobasic ammonium phosphate, phosphoric acid, phosphorus acid, and combinations thereof.

3. A method of claim 1 wherein said aluminum oxide yielding species is selected from the group consisting of boehmite, gibbsite, and combinations thereof.

4. A method of claim 3 wherein said aluminum oxide yielding species is boehmite.

5. A method of claim 1 wherein the heat-treating temperature is about 500° C. to about 700° C.

6. A method of claim 1 wherein said $AlPO_4$ content is about 7% to about 10% by weight.

7. A method of claim 1 wherein the average pore radius of said phosphate-$Al_2O_3$ is about 20Å to about 40Å.

8. A method of claim 1 wherein the pore volume of the phosphate-$Al_2O_3$ is about 0.3 to about 0.8 cc/g.

9. A method of claim 1 wherein in about 60% to about 85% of the pore volume, the pore radius is about 20Å 100Å.

10. A method of claim 9 wherein in about 5 to about 10% of the pore volume, the pore radius is about 100 to about 200Å, in about 35 to about 45% of the pore volume, the pore radius is about 50 to about 100Å, and in about 30 to about 50% of the pore volume, the pore radius is about 20 to about 50Å.

11. A method of claim 1 comprising the additional step of applying the phosphate-$Al_2O_3$ of claim 1 to a body to form a coating thereon.

12. A method of claim 11 comprising the additional step of contacting the coated body with a catalyst metal to form a catalyst.

13. A method of claim 11 wherein the body is a honeycomb structure.

14. A method of making a catalyst, said method comprising:

a) providing a support comprising the phosphate-$Al_2O_3$ produced by the method of claim 1; and b) contacting said support with a catalyst metal to form the catalyst, wherein the catalyst metal is homogeneously distributed on said support.

15. A method of claim 14 comprising the additional step of contacting the catalyst with a substrate.

16. A method of claim 15 wherein the substrate is a honeycomb structure.

17. A phosphate-$Al_2O_3$ wherein the $AlPO_4$ content is about 3 to 12 percent by weight, the specific surface area as measured by $N_2$ BET method is at least about 50 $m^2/g$, and the average pore radius is no greater than about 200Å, said phosphate-$Al_2O_3$ being made by the method of claim 1.

18. A phosphate-$Al_2O_3$ of claim 23 wherein the $AlPO_4$ content is about 7 to 10 percent by weight.

19. A phosphate-$Al_2O_3$ of claim 17 wherein the average pore radius is about 20Å to about 40Å.

20. A phosphate-$Al_2O_3$ of claim 17 wherein the pore volume is about 0.3 to about 0.8 cc/g.

21. A phosphate-$Al_2O_3$ of claim 17 wherein in about 60% to about 85% of the pore volume, the pore radius is about 20–100Å.

22. A phosphate-$Al_2O_3$ of claim 21 wherein in about 5 to about 10% of the pore volume, the pore radius is about 100 to about 200Å, in about 35 to about 45% of the pore volume, the pore radius is about 50 to about 100Å, and in about 30 to about 50% of the pore volume, the pore radius is about 20 to about 50Å.

23. A coated body wherein the coating comprises the phosphate-$Al_2O_3$ of claim 17.

24. A coated body of claim 23 wherein the coating has a catalyst metal uniformly dispersed thereon.

25. A coated body of claim 23 wherein the body has a honeycomb structure.

26. A catalyst comprising:

a) a support which comprises the phosphate-$Al_{23}$ material of claim 17; and b) a catalyst metal uniformly dispersed on said phosphate-$Al_2O_3$.

27. A catalyst of claim 26 wherein the catalyst is in the form of a coating on a substrate.

28. A catalyst of claim 27 wherein the substrate is a honeycomb structure.

29. A catalyst of claim 26 wherein the catalyst is for converting $NO_x$, CO, and hydrocarbons to innocuous products.

30. A catalyst of claim 29 wherein the metal is a transition metal.

31. A catalyst of claim 30 wherein the catalyst metal comprises Rh and at least one noble metal selected from Pt and Pd.

32. A catalyst of claim 29 wherein the support further comprises at least one component selected from rare earth oxide, and molecular sieve.

33. A catalyst of claim 32 wherein the support further comprises zirconium oxide.

34. A catalyst of claim 29 wherein the support comprises cerium oxide, the metal comprises Rh and at least one noble metal selected from Pt and Pd wherein the weight ratio of said Pt and/or Pd to Rh is about 5:1 to 30:1, the catalyst is in contact with a substrate, and the amount of said Rh and said Pt and/or Pd is about 1 to 2 g/l of said substrate.

* * * * *

UNITED STATES PATENT AND TRADEMARK OFFICE
CERTIFICATE OF CORRECTION

PATENT NO. : 5,260,241
DATED : November 9, 1993
INVENTOR(S) : William P. Addiego, Irwin M. Lachman, Mallanagouda D. Patil and Jimmie L. Williams It is certified that error appears in the above-indentified patent and that said Letters Patent is hereby corrected as shown below:

Col. 11, line 35, "20Å100Å" should be 20-100Å"

Col. 12, line 9, "23" should be "17"

Col. 12, line 31, "phosphate-$Al_{23}$" should be "phosphate-$Al_2O_3$"

Col. 12, line 40, "$NO_\%$" should be "$NO_x$"

Signed and Sealed this

Twenty-eight Day of February, 1995

Attest:

BRUCE LEHMAN

Attesting Officer

Commissioner of Patents and Trademarks